United States Patent

[11] 3,626,331

[72] Inventor Donald B. Burns
La Grange, Ill.
[21] Appl. No. 48,803
[22] Filed June 8, 1970
[45] Patented Dec. 7, 1971
[73] Assignee Motorola, Inc.
Franklin Park, Ill.

[54] AUDIO SIGNAL PROCESSOR
13 Claims, 2 Drawing Figs.

[52] U.S. Cl. ........................................ 332/18, 325/147, 332/24
[51] Int. Cl. ........................................ H03c 3/08, H04b 1/04
[50] Field of Search ........................................ 307/264; 325/147; 328/169; 330/30 D; 332/18, 24, 37

[56] References Cited

UNITED STATES PATENTS 3,109,991 11/1963 Ocko ........................ 332/18 X

*Primary Examiner*—John Kominski
*Assistant Examiner*—Lawrence J. Dahl
*Attorney*—Mueller & Aichele

ABSTRACT: A modulating processing system for a phase or frequency modulated transmitter includes a differentiator and limiter for controlling the deviation of the modulated signal. The limiter includes a pair of emitter-coupled transistors alternately biased by an input signal between cutoff and conduction. A constant current source is coupled in series with the emitters of the limiter to maintain conduction at less than saturation and temperature compensation circuits are included to stabilize the operation of the system with temperature changes. The circuit is readily adapted to be formed as an integrated circuit.

Inventor
DONALD B. BURNS
By
Mueller, Aichele and Rauner
Attys.

Inventor
DONALD B. BURNS

By *Mueller, Aichele and Rauner*

Attys.

AUDIO SIGNAL PROCESSOR

BACKGROUND OF THE INVENTION

Deviation control of phase and frequency modulated transmitters is important not only because it is required by the Federal Communications Commission but also because it serves to prevent audio distortion, loss of intelligibility and decrease in the signal-to-noise ratio in the receiver which may be due to excess modulation deviation. Circuits have been developed for controlling the deviation by processing the modulating signal. While theses circuits have worked well in existing systems, they have not been designed so that they can be readily formed as part of an integrated circuit. For example, they may include inductances which cannot at present be made part of an integrated circuit or they may include capacitance whose values are so large that it is extremely difficult to include them in an integrated circuit structure. Further, the limiters used in some deviation control circuits using only solid-state components have included a limiting transistor biased between cutoff and saturation. While a transistor can be readily cutoff sharply, it is not easily biased to a definite saturation point so that the clipped waveform developed by a transistor in saturation is not sharply defined. This gives rise to an unsymmetrical clipped waveform having excessive distortion. Also, large numbers of components are required to temperature compensate the transistors used in such a circuit.

SUMMARY OF THE INVENTION

It is, therefore, an object of the invention to provide a deviation control circuit incorporating transistors and other solid-state devices.

Another object of this invention is to provide a deviation control circuit in which the limited waveform is symmetrical.

Another object of this invention is to provide a deviation control circuit which includes temperature compensating circuitry.

Another object of this invention is to provide a deviation control circuit which can be readily formed as part of an integrated circuit structure.

In practicing this invention a voice signal which is to be used to modulate a carrier wave is differentiated and the differentiated modulating signal is applied to a phase-splitting circuit. The phase-splitting circuit develops a pair of differentiated modulating signals differing in phase by approximately 180°. A limiter is formed by a pair of transistors having common emitter electrodes coupled together. The pair of differentiated modulating signals are applied to the separate bases of the pair of limiting transistors to bias the limiting transistors alternately between conduction and cutoff. A constant current circuit is coupled in series with the common electrodes to maintain the current flow through the limiter at a predetermined value to limit the current through the conducting one of current limiting transistors to a value less than saturation. An output is taken from the collector of one of the limiting transistors. By this means the current through the limiting transistors alternates between zero and a predetermined level less than saturation and the output waveform is sharply limited, symmetrical and has low distortion.

The circuit also includes semiconductor bias circuits which act to stabilize the circuit with changes in ambient temperature. The circuit is readily adaptable to be formed as part of an integrated circuit.

The invention is illustrated in drawings of which:

FIG. 2 is a partial block diagram and partial schematic of a transmitter incorporating the circuit of the deviation control circuit of this invention; and FIG. 2 is a drawing of an integrated circuit chip incorporating the modulating processing circuit of FIG. 1.

DETAILED DESCRIPTION OF THE INVENTION

Figure 1:
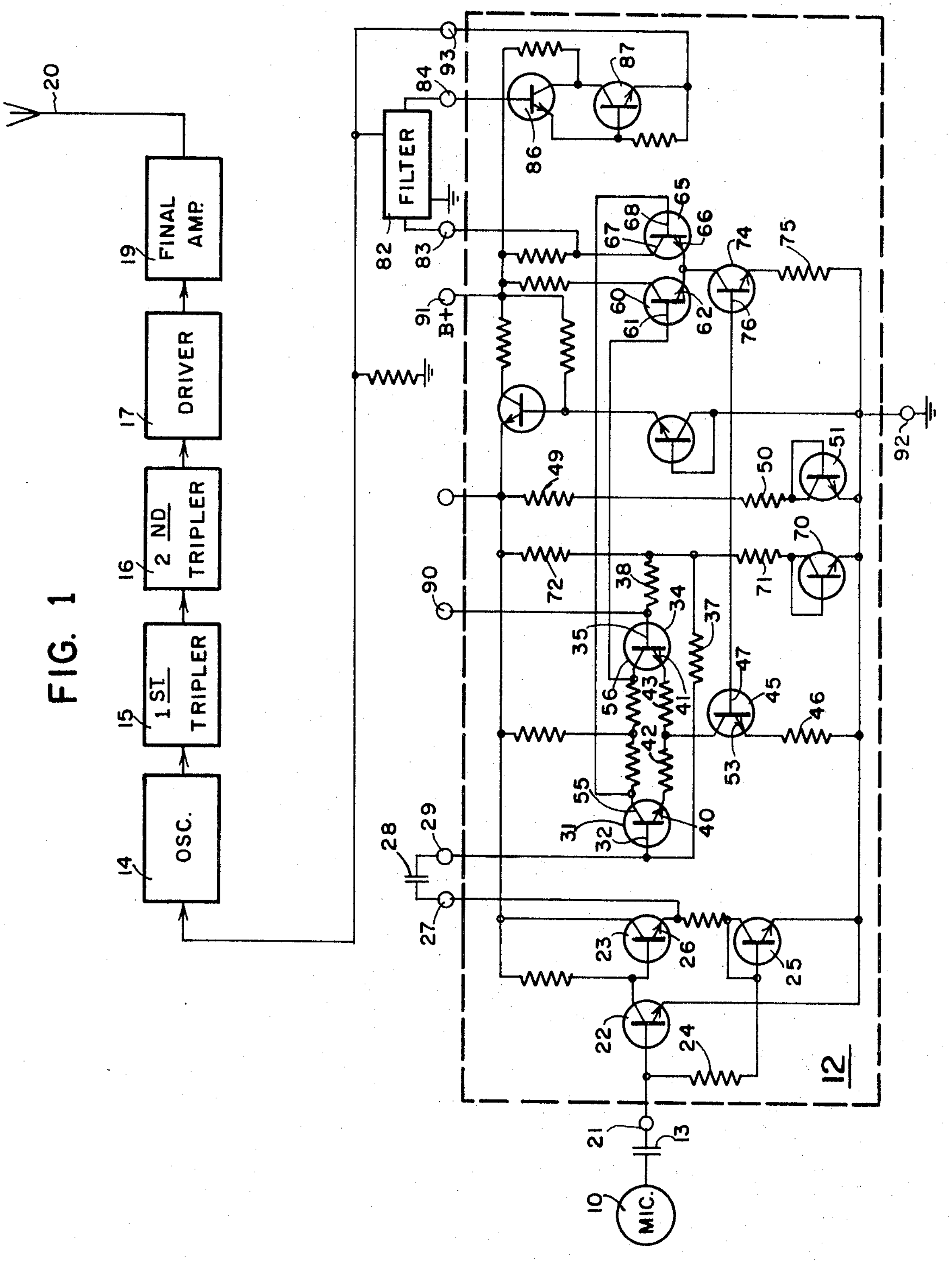

Referring to FIG. 1 modulating signals from microphone 10 are coupled to the signal modulating processing circuit 12 through capacitor 13. The output of modulation processing circuit 12 is coupled to oscillator 14 where it acts to vary the deviation of oscillator 14 in accordance with the modulation signal. The output of oscillator 14 is amplified and tripled in frequency in each of first and second triplers 15 and 16. The output signal from second tripler 16 is further amplified in driver 17 and final amplifier 19. The output of final amplifier 19 is coupled to antenna 24 for radiation thereby.

The modulating signal applied to processing circuit 12 is differentiated by capacitor 13 and resistor 24 to provide preemphasis and is amplified by transistors 22 and 23. Transistor 25 is connected as a diode and acts to temperature compensate the amplifying transistors 22 and 23. The output signal from transistor 23 is coupled from emitter 26 through capacitor 28 to base 32 of transistor 31 and base 35 of transistor 34. Further preemphasis of differentiation may be provided by capacitor 28 and the input impedance of transistors 31 and 34. Resistors 37 and 38 together with the input resistance of transistor 34 act to attenuate the signal applied to base 35. Emitters 40 and 41 of transistors 32 and 34 are coupled together through resistors 42 and 43 to form an emitter-coupled amplifier. The junction of resistors 42 and 43 is coupled to a reference potential through a constant current source consisting of transistor 45 and resistor 46. A bias current for base 47 of transistor 45 is applied from a bias circuit consisting of resistors 49 and 50 and transistor 51 connected as a diode. Diode 51 has the same base-to-emitter voltage drop characteristics with temperature as does transistor 45 so that the changes in voltage drop of diode 51 with temperature acts to compensate for the changes in base 47 to emitter 53 voltage drop in transistor 45 thus maintaining the current flow through the transistor 45 at a relatively constant level.

The conduction through transistors 31 and 34 is determined by the difference between the input signal appearing on bases 32 and 35. Since the signal appearing on base 35 is attenuated with respect to the signal appearing on base 32 the transistor having the greatest conduction alternates so that the output taken from collectors 55 and 66 a re substantially identical signals 180° out-of-phase with each other. Thus transistors 31 and 34 act as a phase splitter for the circuit. Transistor 70 connected as a diode together with resistors 71 and 72 form a bias network for base 32 of transistor 31 and base 35 of transistor 34. Diode 70 acts to temperature compensate bias network so that the bias voltage applied to transistors 31 and 34 is changed to compensate for changes in ambient temperature.

The output signal from collectors 55 and 56 of transistors 31 and 34 are coupled to bases 68 and 61 respectively of transistors 65 and 60. Transistors 60 and 65 form a limiter which produces a highly symmetrical clipped and limited waveform. The signal applied to bases 61 and 68 is always sufficiently strong to cutoff one of the two transistors and bias the other transistor to conduction. Emitters 62 and 66 are coupled together and in series with transistor 74 and resistor 75. Base 76 of transistor 74 is coupled to the bias network which maintains the flow of current through transistor 74 at a constant value. Diode 51 acts to temperature compensate constant current transistor 74 in the same manner as it acts to temperature compensate transistor 45.

The current flowing through transistors 60 and 65 is held constant at a value determined by transistor 74. Since one of the two transistors 60 and 65 is always cutoff the entire amount of this current flows through the other of the two transistors. For example transistor 65 alternates between conduction at a predetermined current level and nonconduction. The predetermined current level is chosen so that the transistor is operating at a value of conduction less than saturation. This produces a highly symmetrical output waveform on collector 67 of transistor 65 since the rounding off and "-mushiness" of the transistor conduction curve as it approaches and enters saturation does not affect the output signal and distortion is maintained at a low value.

The output signal from collector 67 of transistor 65 is coupled to oscillator 14 through filter 82 and transistors 86 and 87. Filter 82 is a splatter filter required by the Federal Communication Commission and acts to remove harmonics from the output signal.

Figure 2:
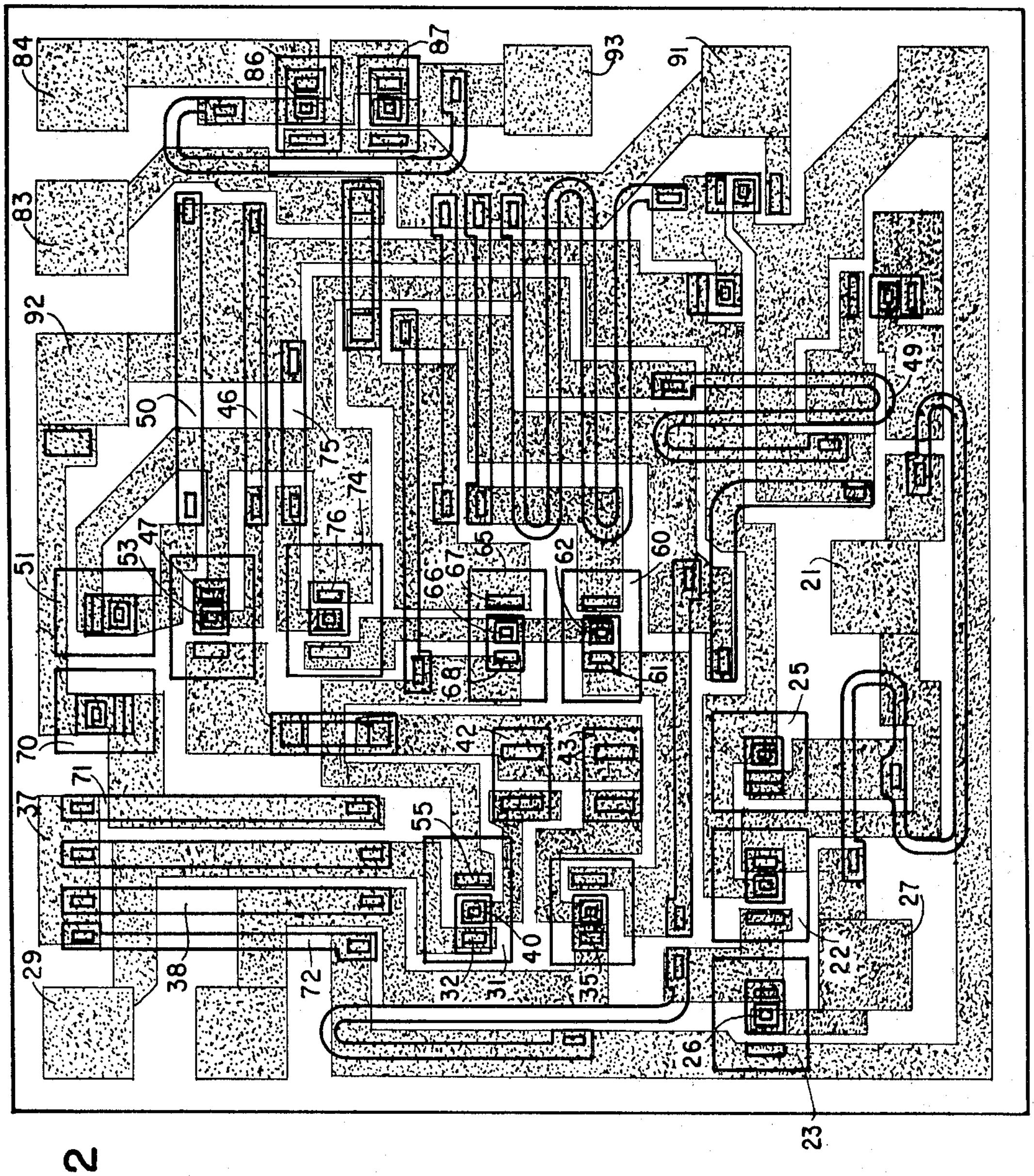

In FIG. 2 there is shown an integrated circuit chip incorporating the audio signal processor 12 of FIG. 1. Portions of the integrated circuit chip which have the same function as the circuit elements of FIG. 1 have the same reference numbers. The microphone input is made to terminal 21 of the integrated circuit chip and the output is taken from terminal 93. Capacitor 28 and filter 82 are discrete components connected to terminals 27 and 29 and terminals 83 and 84 respectively. Power is supplied to terminals 91 and 92. Terminal 90 provides a test point.

I claim:

1. In a modulation system in which a carrier wave signal is modulated by a modulating signal, the system for controlling the deviation and audio frequency response, including in combination, input circuit means for receiving the modulating signal, differentiating means coupled to said input circuit means for producing therefrom a differentiated modulating signal, phase-splitting means coupled to said differentiating means for developing a pair of differentiated modulating signals differing in phase by approximately 180°, limiting means including a pair of transistors having common electrodes coupled together, first and second input electrodes and first and second output electrodes, circuit means coupling said phase-splitting means to said limiting means for applying one of said differentiated modulating signals to said first input electrode, and the other of said differentiated modulating signals to said second input electrode, constant current means coupled in series with said common electrodes of said limiting transistors and to a first reference potential, said pair of differentiated modulating signals acting to bias each of said limiting transistors alternately between conduction and cutoff, said constant current means acting to limit the current through said conduction one of said current-limiting transistor to a value less than saturation.

2. The modulation processing system of claim 1 wherein, said constant current means includes a transistor having a first electrode coupled to said common electrodes, a second electrode coupled to said first reference potential and a control electrode, first bias circuit means coupled to said control electrode for applying a bias potential thereto for establishing the value of current through said first and second electrodes of said constant current means transistor.

3. The modulation system of claim 2 wherein said first electrode of said constant current means transistor is a collector electrode, said second electrode of said constant current means transistor is an emitter electrode and said control electrode of said constant current means transistor is a base electrode, said first bias circuit means includes a first bias diode having first and second electrodes and a plurality of voltage divider resistors connected in series between said first reference potential and a second reference potential and with said first electrode of said first bias diode being connected to said base electrode of said constant current means transistor, the voltage drop of said first bias diode changing with temperature in the same manner as the base-to-emitter voltage drop of said constant current means transistor to compensate said constant current means for changes in temperature.

4. The modulation signal processing system of claim 3, wherein said phase-splitting means includes first and second phase-splitting transistors each having one base, emitter and collector electrodes, said emitter electrodes of said phase-splitting transistors being coupled together to form an emitter-coupled amplifier, said collector electrodes of said phase-splitting transistors being individually coupled to separate ones of said first and second input electrodes of said pair of limiting means transistors, said base electrode of said first phase-splitting transistor being coupled to said differentiating means, and attenuation means coupling said base electrode of said second phase-splitting transistor to said differentiating means to attenuate signals applied to said second phase-splitting transistor, whereby the differentiated modulating signals applied to said base electrode of said second phase-shifting transistor have a smaller magnitude than the differentiated modulating signals applied to said base electrode of said first phase-splitting transistor.

5. The modulation system of claim 4 wherein, said phase-splitting means further includes a current-regulating transistor coupling said emitter electrodes of said phase-splitting transistor to said first reference potential, said current-regulating transistor including a base electrode coupled to said first electrode of said first bias diode, said first bias diode providing temperature compensation for said current-regulating transistor, a second bias diode coupled in series with a second plurality of voltage divider resistors between said first and second reference potentials, said second bias diode begin coupled to said base electrode of said first and second phase-splitting transistors to provide a bias current therefore, the voltage drop of said first bias diode changing with temperature in the same manner as the base-to-emitter voltage drop of said first and second phase-splitting transistors to compensate said phase-splitting means for changes in temperature.

6. The modulation system of claim 5 wherein, said input circuit means includes amplifying means coupled to said differentiating means for amplifying the modulating signal.

7. The modulation system of claim 6 further including output circuit means having filter means coupled to one of said first and second output electrodes of said limiting means transistors and output means coupled to said filter means.

8. The modulation system of claim 1 wherein, said differentiating means includes a capacitor portion and an impedance portion, said differentiating means further including a first terminal coupled to said input circuit means and a second terminal, said capacitor portion being coupled between said first and second terminals, said input circuit means, said first and second terminals, said impedance portion, said phase-splitting means, said circuit means, said limiting means and said constant current means being formed as a monolithic integrated circuit.

9. The modulation processing system of claim 8 wherein said constant current means includes a transistor formed as a portion of said integrated circuit structure and having a first electrode coupled in series with said common electrodes, a second electrode coupled to said first reference potential and a control electrode, first bias circuit means formed as a portion of said integrated circuit structure and coupled to said control electrode for applying a bias potential thereto for establishing the value of current through said first and second electrodes of said constant current means transistor.

10. In a modulation system in which a carrier wave signal is frequency or phase modulated by a modulating signal, the system for processing the modulating signal to control the deviation and audio response of the modulated carrier wave including in combination, circuit means having an input for receiving the modulating signal and first and second outputs, said circuit means including differentiating and phase-splitting means for differentiating said modulating signal and producing at said outputs differentiated modulating signals differing in phase by approximately 180°, and limiting means having first and second limiter inputs individually coupled to said first and second outputs of said circuit means and a limiter output, said limiting means including first and second semiconductor devices having control electrodes individually coupled to said first and second limiter inputs and common electrodes connected together, and constant current means connected in series between said common electrodes and a reference potential, said semiconductor devices limiting the differentiated modulating signals differing in phase which are applied to said first and second limiter inputs and providing a symmetrically limited signal at said limiter output.

11. The processing system of claim 10 wherein said first and second semiconductor devices are first and second transistors each having base, emitter, and collector electrodes, with said base electrodes forming control electrodes and being coupled to said first and second inputs and said emitter electrodes of said transistors forming said common electrodes, said differentiated modulating signals rendering said transistors alternately conductive and cutoff, and said constant current means acting to limit the current through the conducting one of said transistors.

12. The processing system of claim 11 wherein said phase-splitting means includes first and second transistors each having base, emitter, and collector electrodes, with said emitter electrodes connected together to form an emitter-coupled amplifier, and said collector electrodes being coupled to said first and second outputs.

13. The processing system of claim 11 wherein said first and second transistors of said limiting means, and said first and second transistors of said phase-splitting means are constructed as a monolithic integrated circuit.

* * * * *

UNITED STATES PATENT AND TRADEMARK OFFICE

CERTIFICATE OF CORRECTION

PATENT NO. : 3,626,331

DATED : December 7, 1971

INVENTOR(S) : DONALD B. BURNS

It is certified that error appears in the above-identified patent and that said Letters Patent are hereby corrected as shown below:

On The Summary Sheet, Column 1, line 22, before "June 8, 1970" insert -- Continuation of Serial No. 791,076, Jan. 14, 1969 --.

Signed and Sealed this

*Thirty-first* Day of *July 1979*

[SEAL]

*Attest:*

*Attesting Officer*

LUTRELLE F. PARKER

*Acting Commissioner of Patents and Trademarks*